Sept. 22, 1936.  E. S. McGONEGAL  2,055,302
PORTABLE GRINDING TOOL
Filed March 7, 1936   2 Sheets-Sheet 1

INVENTOR.
ERR S. McGONEGAL
BY
ATTORNEYS.

Sept. 22, 1936.  E. S. McGONEGAL  2,055,302
PORTABLE GRINDING TOOL
Filed March 7, 1936  2 Sheets-Sheet 2
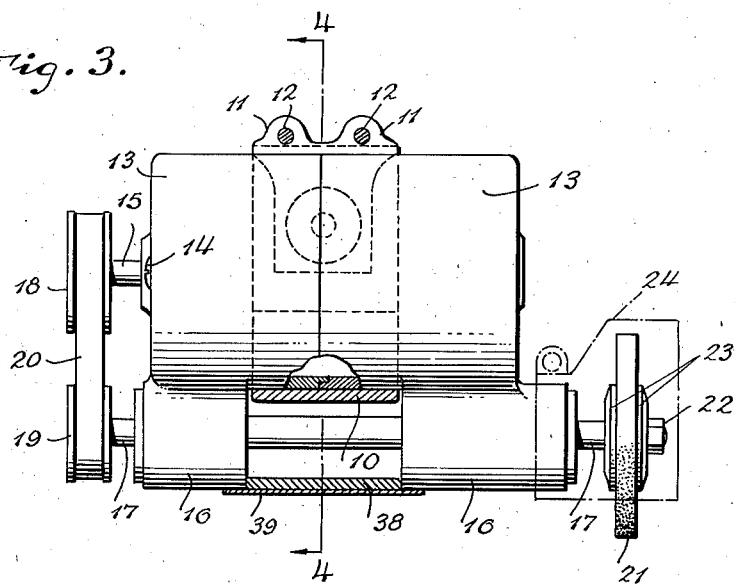
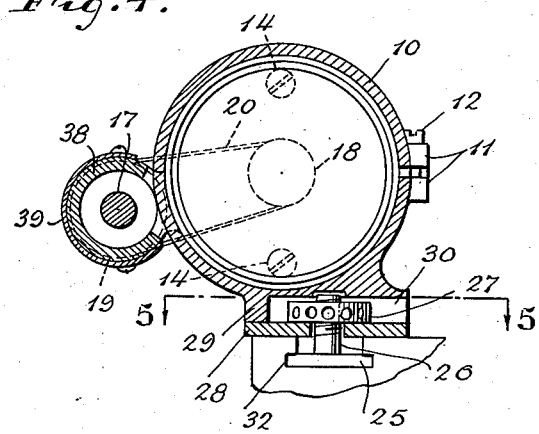
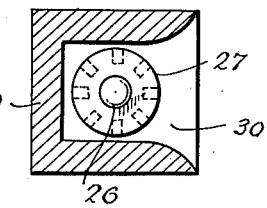
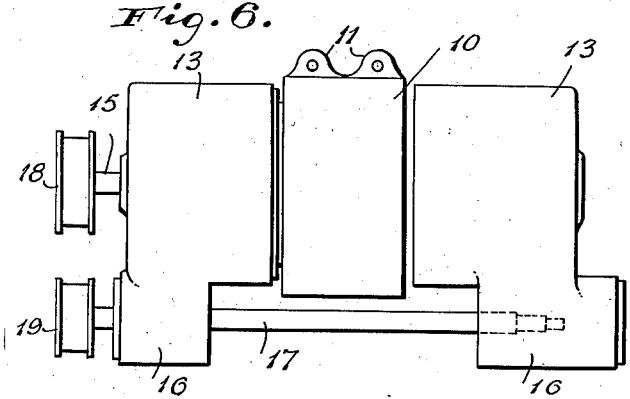
INVENTOR.
EIRR S. McGONEGAL
BY
ATTORNEYS.

Patented Sept. 22, 1936

2,055,302

UNITED STATES PATENT OFFICE 2,055,302

PORTABLE GRINDING TOOL

Err S. McGonegal, Rutherford, N. J.

Application March 7, 1936, Serial No. 67,568

5 Claims. (Cl. 51—259)

The invention relates to portable grinding tools of the type disclosed in my prior United States Patent No. 1,756,949, and has for its object to provide a novel arrangement and construction in which the grinding tool and more particularly the grinding spindle and its associated elements may be easily adjusted to and set in the most efficient operative position. Other more specific objects will appear from the description hereinafter and the features of novelty will be pointed out in the claims.

Figure 1:
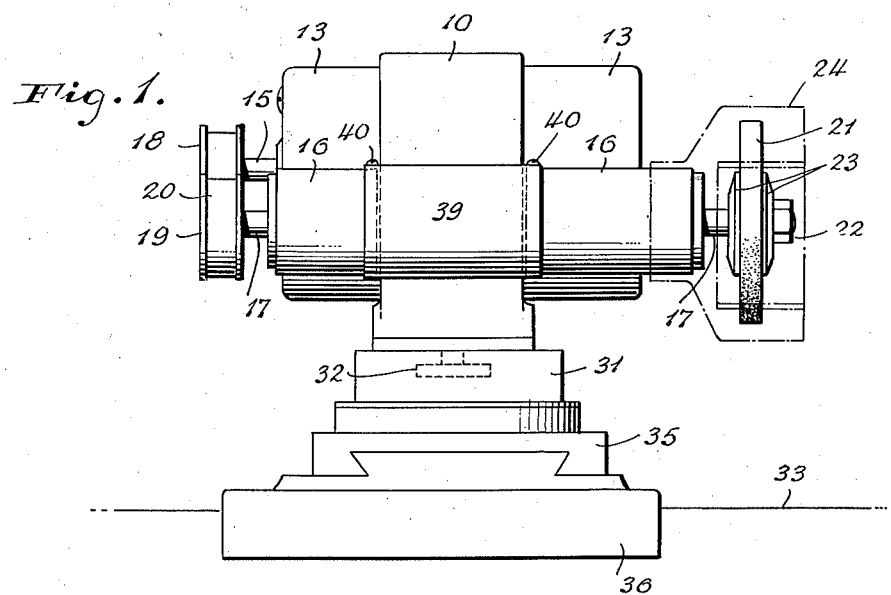
Figure 2:
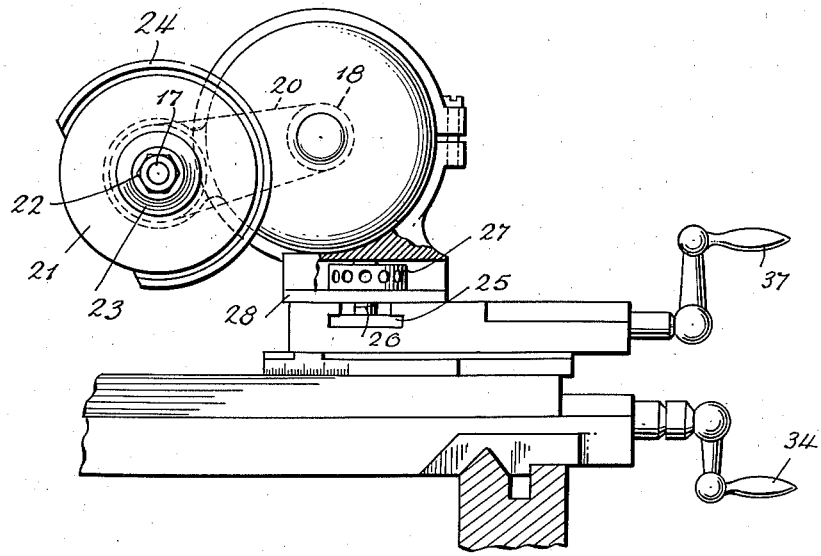

In the accompanying drawings which illustrate an example of the invention without defining its limits, Fig. 1 is a side elevation of the novel grinding tool; Fig. 2 is an end view thereof partly in section; Fig. 3 is a plan view of the grinding tool partly in section; Fig. 4 is a sectional view on the line 4—4 of Fig. 3; Fig. 5 is a detailed horizontal section on the line 5—5 of Fig. 4 and Fig. 6 is a disassembled view showing the parts of the specific form illustrated in the drawings in separated relation to each other.

In all of its forms the novel grinding tool comprises a support on which the motor casing of a motor is mounted so as to be rotatably adjustable on its axis relatively to said support. In addition the grinding tool includes a grinding spindle housing carried by the motor casing in external parallel relation thereto and partaking of the rotative movements of said motor casing relatively to the support and adjustable thereby to different operative positions. In the specific form shown in the drawings, the support comprises a split bearing ring 10 provided with lugs 11 and set screws 12 for causing said bearing ring to develop a clamping action on the motor casing whereby the latter is fixed in an adjusted position on the support. The motor casing in its illustrated form consists of two opposed sections 13 fitted together within the bearing ring 10 as shown in Fig. 3, the sections 13 of the motor casing being detachably connected with each other in any suitable manner as by means of screws 14. The operating parts of the motor are contained within the motor casing and include a motor spindle 15 which projects exteriorly of the motor casing as shown in Fig. 3. In the illustrated example, the grinding spindle housing consists of journals 16 each of which is mounted upon one of the sections 13 and preferably comprises an integral part of said section 13. In any case the journals 16 are located in external parallel relation to the motor casing in spaced axial registry with each other for the accommodation of the grinding spindle 17 which is rotatably mounted in the grinding spindle housing or more specifically, the journals 16 in any conventional manner and projects therefrom at opposite ends. In addition to the parts so far described, the grinding tool includes a driving connection between the motor and the grinding spindle which is effective in all adjustments of the latter. As shown in the illustrated example this driving connection may comprise driving pulleys 18 and 19 located on the motor spindle 15 and on one projecting end of the grinding spindle 17 respectively, and operatively connected with each other by means of a driving belt 20. At its opposite end the grinding spindle 17 is constructed to detachably receive a suitable grinding wheel 21, or its equivalent, which may be suitably fixed in place on said spindle 17 for instance by means of a nut 22 and conventional collars 23. For the protection of the operator of the tool during use thereof, a guard 24 of any suitable type may be mounted upon the tool so as to extend about the grinding wheel 21 as shown by dotted lines in Figs. 1 and 3, and in solid lines in Fig. 2.

The grinding tool preferably includes means for fixing the same in an operative position, for instance, upon a conventional lathe. In the illustrated example this means consists of a clamping block 25 provided with a preferably integral stud 26 threaded at its upper end to receive for instance a capstan-nut 27. As shown in Fig. 4 the stud 26 projects through an opening in a plate 28 suitably secured to a boss 29 forming part of the support or bearing ring 10 and provided with an open recess 30 for the accommodation of the capstan-nut 27 or its equivalent.

To mount the grinding tool upon a lathe it is simply necessary, for instance, to remove the customary tool post from the tool post carrier 31 and to introduce the clamping block 25 into the conventional undercut groove 32 of said carrier 31. After the tool has been set in the desired position upon the carrier 31 it may be fixed in such position by simply tightening the capstan-nut 27 on the stud 26 as will be apparent.

When thus mounted upon the lathe, the bearing ring 10 or its equivalent, and the motor casing with its associated elements are firmly and rigidly fixed upon the compound rest of the lathe. In this position the grinding spindle 17 and consequently the grinding tool 21 may be adjusted to the most efficient operating position or to any position within its range of adjustment by simply rotating the motor casing sections 13 as a unit relatively to the support 10 or specifically within the bearing ring 10 about the axis of the motor. It will be understood that the set screws 12 are first loosened to permit such rotative adjustment of the motor casing and that said set screws 12 are again tightened when the desired adjustment has been reached to fix the parts in their adjusted positions. Because of the fact that the grinding spindle housing or specifically the journals 16 are carried by the motor casing sections 13, the grinding spindle 17 and its associated elements will partake of the rotative movements of the motor casing relatively to the support, or in other words, in the bearing ring 10 so that the grinding spindle 17 is adjustable with the journals 16 about the axis of the motor to different operative positions in external radial relation to the motor casing. As the movements of adjustment of the grinding spindle 17 and its associated elements occur in arcs, having the axis of the motor for a center, it will be obvious that the driving connection illustrated in the form of the pulleys 18, 19 and the belt 20 will be effective in all adjustments of the grinding spindle 17 and that said grinding spindle 17 will be efficiently operated by the motor regardless of the position to which said spindle 17 has been adjusted.

By reason of being mounted upon the compound rest of a lathe as in the illustrated example, the grinding wheel 21 or its equivalent, will have the additional advantage of the varied and compound adjustments which are possible through the medium of said compound rest. The latter may be of any conventional construction and mounted on the lathe bed 33 in any well-known way, the customary crank handle 34 and co-operating means being provided for adjusting the slide 35 of the lathe on the saddle 36 thereof; in addition, the usual crank handle 37 and associated elements are present in the lathe for adjusting the tool post carrier 31 on the slide 35, it being further understood that the carrier 31 is also adjustable in circular directions in the well-known way.

With the arrangement illustrated and described the novel grinding tool may be easily and quickly mounted upon a conventional lathe in a most efficient position and may be easily adjusted as required by the customary adjusting mechanisms of said conventional lathe to effect a performance of maximum efficiency. In addition the grinding tool spindle and the grinding tool carried thereby may be readily adjusted to its most efficient operating position relatively to the means whereby the grinding tool is fixed in operative position regardless of the adjustments of the tool as a whole on the lathe.

It will of course be obvious that the novel portable grinding tool illustrated and described herein may be mounted on other machines or otherwise as occasion may require without affecting any of its advantages.

If desired, provision may be made to exclude dust and other foreign matter from the grinding spindle housing or more specifically the journals 16; as shown in the drawings this means may consist of a sleeve 38 fitted about the spindle 17 between the journals 16 and covered externally by a plate 39 which may comprise a name plate and in any case may be suitably fixed in place as by means of screws 40.

Various changes in the specific forms shown and described may be made within the scope of the claims without departing from the spirit of the invention.

I claim:
1. A portable grinding tool comprising a split bearing ring constituting a support, means carried by said ring for fixing the same in supporting position, a motor including a motor casing consisting of two opposed detachably connected sections fitted together within said bearing ring and rotatable therein, a grinding spindle housing carried by said motor casing in external parallel relation thereto and partaking of the rotative movements of said motor casing in said bearing ring, a grinding spindle journalled in said grinding spindle housing and extending across said bearing ring, said grinding spindle being adjustable with said grinding spindle housing about the axis of said motor to different operative positions relatively to said fixing means, and a driving connection between said motor and said grinding spindle effective in all adjustments of the latter.

2. A portable grinding tool comprising a split bearing ring constituting a support, means carried by said ring for fixing the same in supporting position, a motor including a motor casing consisting of two opposed detachably connected sections fitted together within said bearing ring and rotatable therein, said motor casing projecting in opposite axial directions beyond said bearing ring, bearing sections carried respectively by said motor casing sections at opposite sides of said bearing ring in spaced axial registry with each other and together constituting a grinding spindle housing, said bearing sections partaking of the rotative movements of said motor casing in said bearing ring, a grinding spindle journalled in said bearing sections and extending externally across said bearing ring, said grinding spindle being adjustable with said grinding spindle housing about the axis of said motor to different operative positions relatively to said fixing means, and a driving connection between said motor and said grinding spindle effective in all adjustments of the latter.

3. A portable grinding tool comprising a split bearing ring constituting a support, means carried by said ring for fixing the same in supporting position, a motor including a motor casing consisting of two opposed detachably connected sections fitted together within said bearing ring and rotatable therein, bearing sections located in spaced axial registry with each other at opposite sides of said bearing ring in external parallel relation to said motor casing, said bearing sections each comprising an integral part of one of said motor casing sections and partaking of the rotative movements of said motor casing in said bearing ring, a grinding spindle journalled in said bearing sections and extending externally across said bearing ring, said grinding spindle being adjustable with said bearing sections about the axis of said motor to different operative positions relatively to said fixing means, and a driving connection between said motor and said grinding spindle effective in all adjustments of the latter.

4. A portable grinding tool comprising a support, a motor including a motor casing carried by said support and rotatably adjustable thereon about the motor axis, grinding spindle journals carried by said motor casing in spaced axial registry and in external parallel relation thereto and partaking of the rotative adjustments of said motor casing, a grinding spindle rotatably mounted in said journals in parallel relation to the motor axis and adjustable with said journals about said motor axis to different operative positions relatively to said support, and a driving connection between said motor and said grinding spindle effective in all adjustments of the latter.

5. A portable grinding tool comprising a support, a motor including a motor casing carried by said support and rotatably adjustable thereon about the motor axis, grinding spindle journals comprising integral parts of said motor casing in spaced axial registry and in external parallel relation thereto and partaking of the rotative adjustments of said motor casing, a grinding spindle rotatably mounted in said journals in parallel relation to the motor axis and adjustable with said journals about said motor axis to different operative positions relatively to said support, and a driving connection between said motor and said grinding spindle effective in all adjustments of the latter.

ERR S. McGONEGAL.